Patented Dec. 18, 1923.

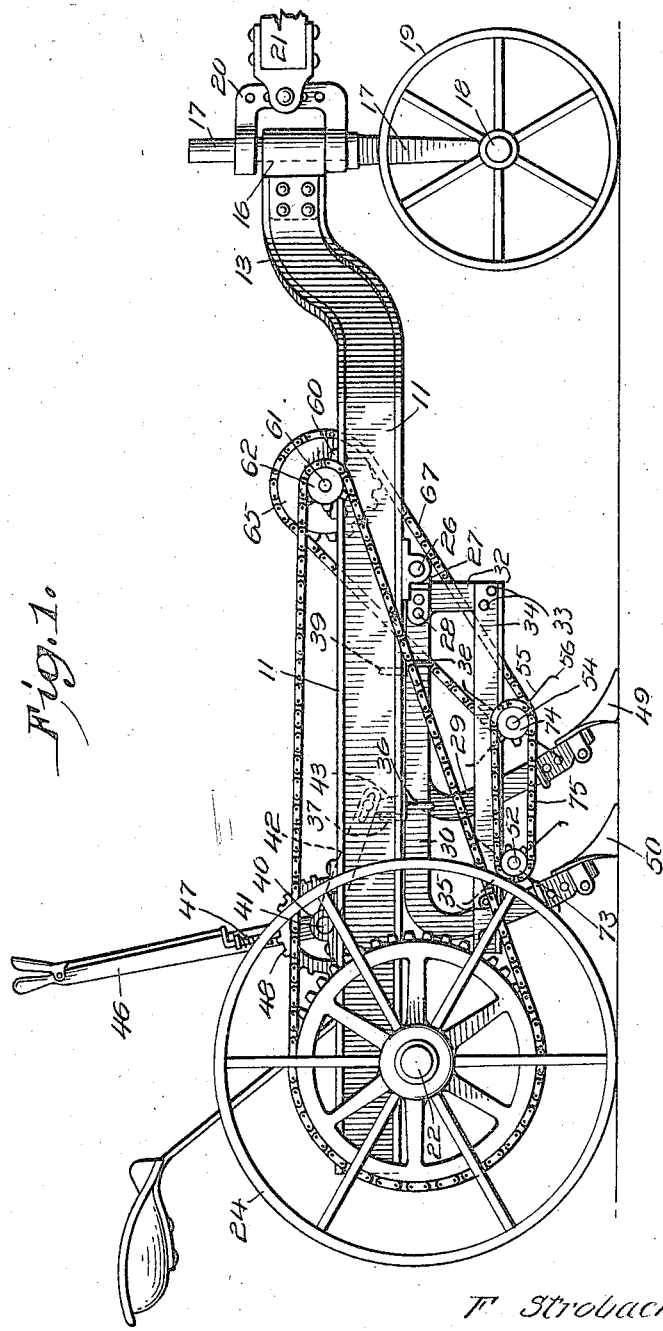

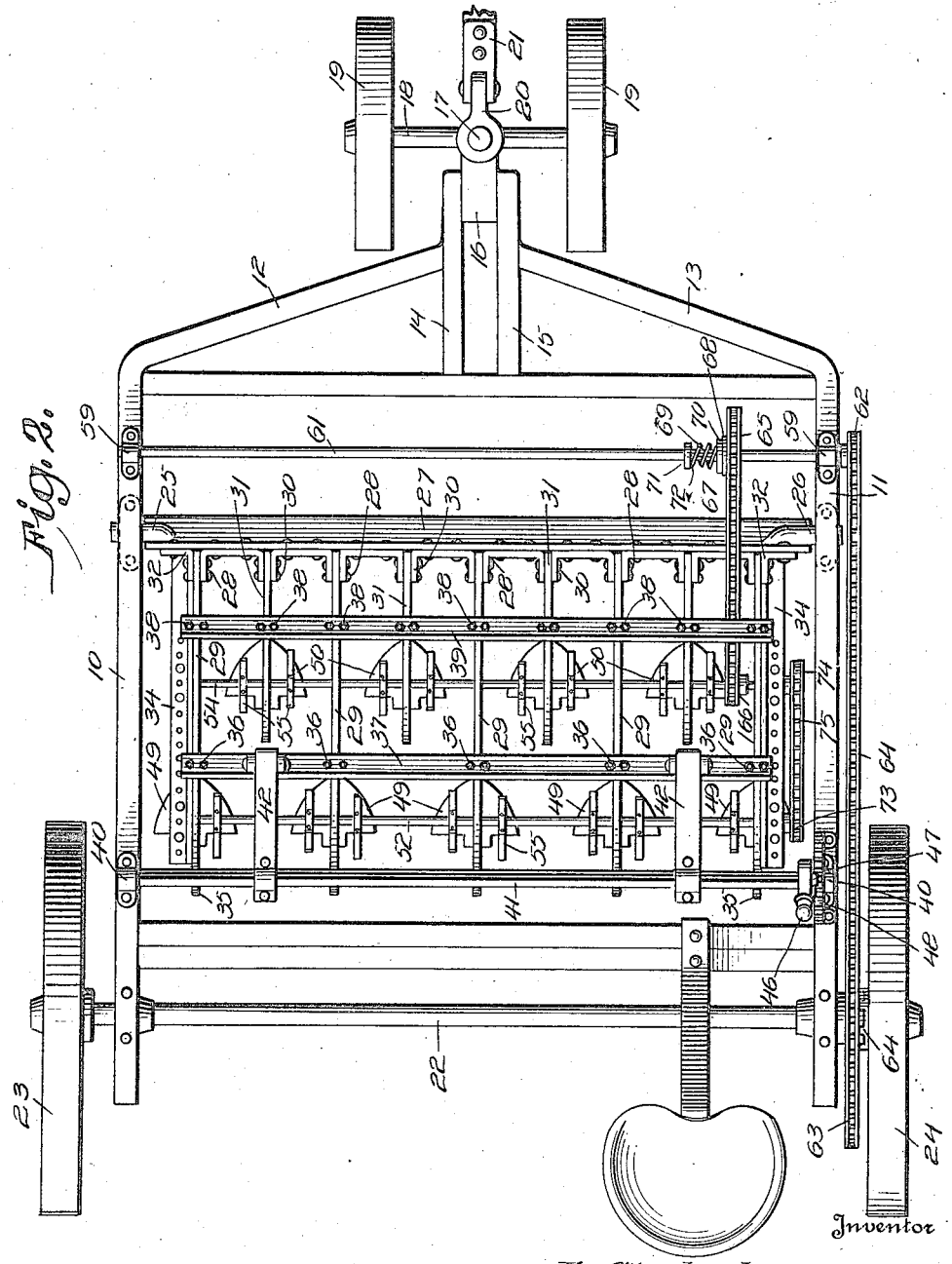

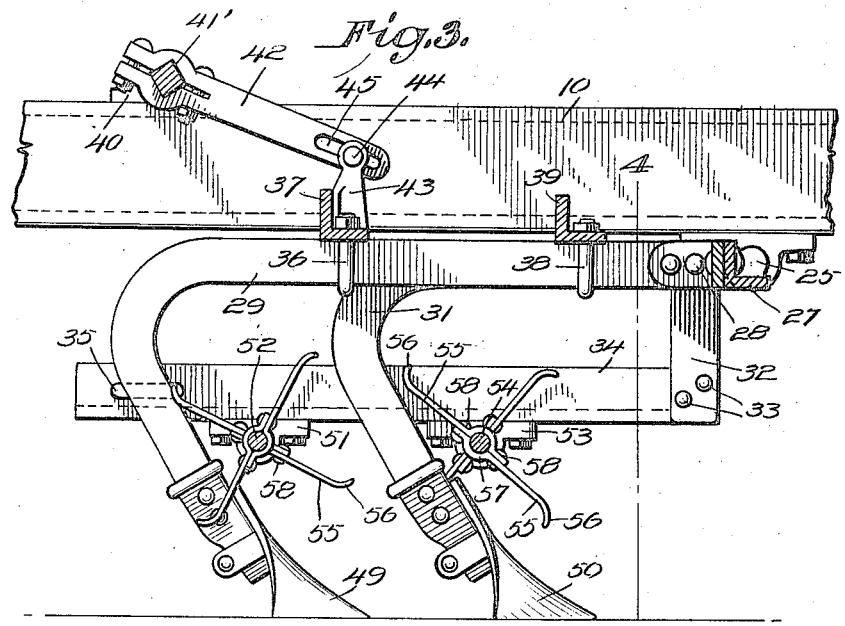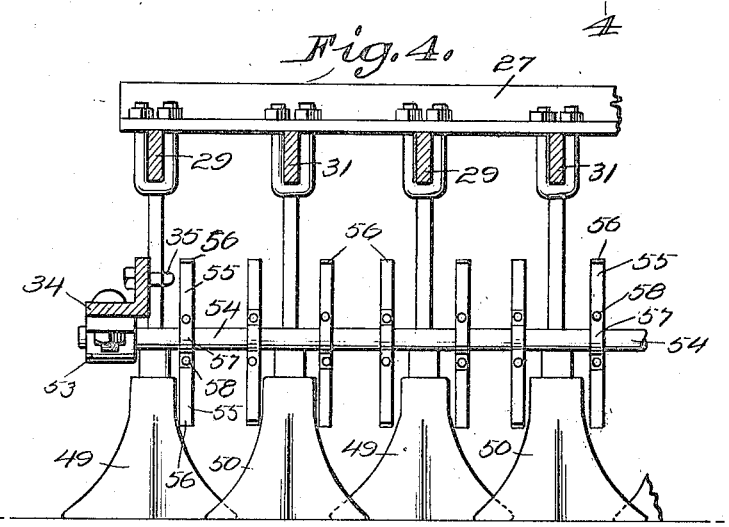

1,478,305

UNITED STATES PATENT OFFICE.

FRED STROBACH, OF AUSTIN, MINNESOTA.

NOXIOUS-WEED ERADICATOR AND SOIL PULVERIZER.

Application filed June 16, 1922. Serial No. 568,802.

*To all whom it may concern:*

Be it known that I, FRED STROBACH, a citizen of the United States, residing at Austin, in the county of Mower and State of Minnesota, and that he verily believes himself to be the original, first, and sole inventor of Improvements in Noxious-Weed Eradicators and Soil Pulverizers, of which the following is a specification.

This invention relates to machines for simultaneously destroying noxious growths and pulverizing the soil preparatory to planting, and has for one of its objects to provide a device of this character, of improved simplicity and increased efficiency, and whereby the noxious growths are effectually separated from earth clinging to the roots and the plants left upon the top of the soil in position to be removed or destroyed.

Another object of the invention is to provide a device of this character, mounted on carrier wheels and adapted to be drawn over the ground, and with means whereby the various movements are produced by the traction wheels of the device.

Another object of the invention it to provide a device of this character, whereby the noxious weeds or plants are torn into small portions and the soil clinging to the roots and elevated by the shovel devices is thoroughly pulverized and deposited in a layer upon the top of the ground and thereby forming a mulch to the soil to receive the seed of plants for the future crop.

With these and other objects in view the invention consists in certain novel features of construction as hereinafter shown and described and then specifically pointed out in the claims, and in the drawings illustrative of the preferred embodiment of the invention:—

Figure 1 is a side elevation of the improved apparatus, and

Fig. 2 is a plan view, of the improved apparatus,

Fig. 3 is an enlarged detail, partly in section, of the cultivating and the weed destroying portions of the apparatus, Fig. 4 is a section on the line 4—4 of Fig. 3.

The improved apparatus includes a supporting frame formed with side rails 10 and 11 extended at their forward ends toward each other as at 12 and 13 and united to spaced portions 14 and 15, the latter rigidly supporting a bracket device 16 in which a standard 17 is mounted for rotation.

The members 10 and 11 together with the extensions 12 and 13 are preferably formed of channel bars as represented.

At its lower end the standard 17 supports a stub axle 18 carrying guide wheels 19.

A clevis device 20 is coupled to the standard 17, the latter supporting a draft tongue, a portion of which is shown at 21.

Supported beneath the rear portions of the side rails 10 and 11 is a main axle 22 carrying traction wheels 23 and 24.

Journalled at 25 and 26 to the frame members 10 and 11 is a rocking bar member 27, preferably of an L bar, and extending between the side rails 10 and 11.

Rigidly connected at 28 to the rocking bar 27 are a plurality of relatively long beam members 29, and connected at 30 to the bar 27 are a plurality of relatively short beam members 31, the shorter beam members alternating with the longer beam members.

Four of the shorter beams and five of the longer beams are shown for illustration, but any required number may be employed.

Depending from the terminal coupling members 28 are hangers 32, and connected at their forward ends at 33 to the hangers, are supporting bars 34, the latter coupled at 35 to the downturned or "standard" portions of the longer beams 29.

Connected at 36 transversely of the longer beams 29 is a coupling bar 37, and connected at 38 to the shorter beams 29, and also to the longer beams is a like coupling bar 39, the bars 37 and 39 being preferably of L members, as shown.

By this means the two series of beams are rigidly coupled together and movable in unison around the studs 25.

Supported by bearings 40 on the side rails 10 and 11 is a rock shaft 41, preferably square or other form than round, between its journals, and attached to the shaft at two or more points are arms 42, and rising from the connecting bar 37 are standards 43 pivoted at 44 in slots 45 in the arms 42, as shown more particularly in Fig. 3. Attached to the rock shaft 41 is an operating lever 46 having a pawl device 47 operating over a notched segment 48, by which means the rock shaft may be actuated and held in adjusted position.

The beam members 29 are downturned at their rear ends to form standards to support cultivator or like shovels 49, while the beam members 30 are also downturned to form standards to support cultivator shovels 50.

Attached to the supporting members 34 forwardly of the downturned portions of the longer beams 29, are bearings 51 to rotatively support a shaft 52, while similar bearings 53 are attached to the members 34 forwardly of the downturned portions of the shorter beams 31 to support a shaft 54.

Attached to the shaft 52 at each side of the intermediate beams 29 and at one side of the terminal beams 29, are picker fingers, and likewise attached to the shaft 54 at each side of the shorter beams 29 and at one side of the terminal beams 29, are like picker fingers, and as the picker fingers are alike, the description of one will suffice for all.

Each of the finger devices is in two parts, each part comprising an arm 55 curved laterally at the outer end as shown at 56, and each arm formed with a half bearing 57 to respectively engage the shafts 52 and 54, and coupled together at opposite sides of the shafts by rivets or the like 58.

Mounted by bearings 59 and 60 on the side members 10 and 11 is a shaft 61 carrying a chain pinion 62, and mounted for rotation on the axle 22 is a chain pulley 63. An endless chain 64 operates over the chain pulley 63 and pinion 62, and thus rotates the shaft 61. A clutch device of suitable construction and indicated at 64 is arranged between the axle 22 and the chain pulley 63, to control the motion of the latter.

Mounted loosely upon the shaft 61 is a chain pulley 65, and mounted on the shaft 54 is a chain pinion 66, with an endless chain 67 operating over the pulley 65 and pinion 66.

The chain pulley 65 is formed with a friction clutch member indicated at 68, and slidable on the shaft 61 and rotative therewith in any suitable manner, for instance by a feather key, indicated at 69, is an opposing clutch member 70.

A stop collar 71 is attached to the shaft 61, and supports a spring 72 operating to maintain the clutch elements constantly in yieldable face contact. The spring 72 will possess sufficient strength to hold the pulley 65 in operative engagement with the shaft 61 and thus rotate the shaft 54 against normal resistance, but will yield to stop the rotation of the shaft 54 if abnormal resistance is encountered.

Attached respectively to the shafts 52 and 54 are relatively small chain pulleys 73 and 74 to receive an endless chain 75 whereby the motion of the shaft 54 is transmitted to the shaft 52. The chain pulley 74 is slightly larger than the chain pulley 73, so that the shaft 52 and its attached fingers rotate faster than the shaft 54 and its fingers.

The rear shovel members 49 overlap the forward shovel members 50, as indicated in Figs. 1 and 4, so that no gaps occur in the section of earth engaged by the shovels. The shovels may be of any required size but ordinarily they will be set at about twelve inches apart and each shovel to cut a furrow of about eight inches. The shovels will overlap about two inches and with the longer beams 29 carrying five shovels as shown, the combined and coacting shovels will operate on about fifty-four inches of the ground at each passage thereon.

It will be noted that two sets of the fingers 55 are associated with each shovel, except the terminal shovels of the longer beams, and located to operate above the shovels at each side of the beams 29 and 31. The various chain pulleys are so proportioned that the shaft 54 will be rotated about one hundred and fifty revolutions per minute and the shaft 52 at about one hundred and seventy-five revolutions per minute.

The shovels 49 and 50 may be set to operate at any required depth by adjusting the beams 29 and 30 by the lever 46, and as the machine is drawn forwardly by draft animals, a tractor or other power, a layer of earth, the full width of the coacting shovels is cut loose and carried upwardly over the shovels and thus moved into contact first with the rapidly rotating fingers carried by the shaft 54 which tear the plants thus elevated from the earth clinging to their roots and disintegrate the plants and their roots and scatter them over the ground, and at the same time pulverize the earth released by the shovels and likewise scatter it over the ground. By this means, all the earth separated by the shovels is freed from noxious growths and the latter destroyed and torn into small portions, and the released earth finely pulverized and deposited as a mulch over the ground and in the best condition to receive seed or plant settings for a future crop.

Under some conditions it may be required to operate the rotating fingers without operating the shovels, and in that event, the lever 46 will be turned rearwardly to elevate the shovels clear of the ground so that when the machine is drawn forwardly, the shovels will operate only against the portions of the plants above the ground to hold them in position to be torn in pieces by the rapidly rotating fingers.

The slower operating fingers carried by the forward shaft 54 tear the roots and stalks released by the first line of shovels, and then the more rapidly rotating fingers carried by the rear shaft 52 tear them into still smaller portions and insure their certain destruction.

While operating in uniform conditions of the soil, or with the plant growth of normal sizes or resistance, the spring 72 will hold the shafts 52 and 54 to their work, but if an abnormally heavy root, or a stump or stone, be encountered by the fingers, the springs will permit the motion of the shafts and fingers to be checked without stopping the motion of the tractor wheels or the shaft 61, and thus prevent breakage of the fingers.

The improved device is simple in construction, can be manufactured of any required size of any suitable material.

Having thus described the invention, what is claimed as new is:—

1. A machine for the purpose set forth comprising a portable frame, a rocking element journalled therein, two sets of parallel beam members secured to and projecting rearwardly from said element, one of said sets having its members of greater length and of a greater number than the members of the other set and alternately disposed with respect thereto, said beam members terminating in depending forwardly projecting standards providing a forward and a rear set of standards, a ground working element secured to each standard, supporting bars connected to said rocking element and having their rear terminal portions secured to the outer standards of the rear set of standards, a pair of rotatable shafts suspended from said bars and each arranged forwardly of and in proximity to a set of standards, a series of pair of pulverizing elements carried by each shaft, the pulverizing elements of each pair arranged at opposite sides of and in proximity to a standard, a coupling bar secured to each set of beams and to the supporting bars, operating means for said shafts, and means supported by the frame and connected to that coupling bar secured to the set of long beams for adjusting the position of said ground working elements.

2. A machine for the purpose set forth comprising a portable frame, a rocking element journalled therein, two sets of parallel beam members secured to and projecting rearwardly from said element, one of said sets having its members of greater length and of greater number than the members of the other set and alternately disposed with respect thereto, said beam members terminating in depending forwardly projecting standards providing a forward and a rear set of standards, a ground working element secured to each standard, supporting bars connected to said rocking element and having their rear terminal portions secured to the outer standards of the rear set of standards, a pair of rotatable shafts suspended from said bars and each arranged forwardly from said bars and each arranged forwardly of and in proximity to a set of standards, a series of pairs of pulverizing elements carried by each shaft, the pulverizing elements of each pair arranged at opposite sides of and in proximity to a standard, a coupling bar secured to each set of beams and to the supporting bars, operating means for said shafts, and means supported by the frame and connected to that coupling bar secured to the set of long beams for adjusting the position of said ground working elements, the pulverizing elements carried by one shaft arranged out of alignment with respect to the pulverizing elements carried by the other shaft, and the ground working elements carried by the forward set of standards overlapping the ground working elements carried by the rear set of standards.

In testimony whereof, I affix my signature hereto.

FRED STROBACH.